Patented Jan. 4, 1944

2,338,408

UNITED STATES PATENT OFFICE

2,338,408

MAKING PHOSPHORIC ACID OF HIGH PURITY

John Harry Coleman, Warren Township, Somerset County, and Stephen G. Poll, Woodbridge, N. J., assignors to Westvaco Chlorine Products Corporation, New York, N. Y., a corporation of Delaware No Drawing. Application November 9, 1940, Serial No. 365,127

9 Claims. (Cl. 23—165)

This invention or discovery relates to making phosphoric acid of high purity; and it comprises a simple method of directly preparing phosphoric acid of high purity and marketable concentration from impure phosphatic materials containing acid-soluble impurities such as compounds of iron and alumina, wherein phosphatic materials are united to form an acid mixture containing available CaO and $P_2O_5$ in an over-all ratio lower than the 1:1 ratio of calcium metaphosphate, $Ca(PO_3)_2$ (or $CaO.P_2O_5$), the ratio being advantageously from 3:4 to 1:2, said mixture usually containing more or less gangue carrying acid-soluble compounds of iron and alumina and also containing fluorine, and the mixture is heated in a current of hot gases to a temperature of about 350° C. with removal of moisture and fluorine compounds, thereby forming a dry intermediate containing available CaO and $P_2O_5$ in the desired ratio, and this intermediate is treated with strong sulfuric acid of a concentration adapted to liberate phosphoric acid principally as the meta acid, and to form $CaSO_4$ in a stable form readily filtering and washing and containing water of crystallization in an amount substantially less than that of gypsum, sufficient water being added to the system to give a liquid phase containing relatively concentrated phosphoric acid, and said liquid phase is separated from the solids, advantageously by filtering, to obtain directly a strong marketable phosphoric acid solution of high purity; all as more fully hereinafter set forth and as claimed.

Phosphoric acid and phosphates have generally been made heretofore from the calcium orthophosphates (including fluophosphates) which occur in rock phosphate, apatite, pebble phosphate and other crude commercial phosphatic materials. In the usual wet methods, these ores are digested with relatively weak aqueous sulfuric or phosphoric acids or mixtures thereof to produce an impure dilute solution of orthophosphoric acid or monocalcium orthophosphate or mixtures thereof. The solutions thus obtained are generally quite dilute, seldom having a density above 25 to 35° Bé., and have therefore required evaporative concentration to obtain a material of marketable strength. These solutions also require purification to eliminate the so-called metallic impurities (mainly iron and alumina compounds) prior to sale or utilization. Both the concentration and the purification of the crude solutions obtained by these prior processes involve difficulties well known in the art, and the procedures are costly.

An object achieved by the present invention is the provision of a simple and direct method of making phosphoric acid of high purity and high concentration, which avoids any need for evaporative concentration and which permits a greatly simplified separation of the recovered phosphoric acid from the gangue and metallic impurities and fluorine, and from calcium sulfate formed in the process. These results are achieved in accordance with this invention by taking advantage of the discovery that suitably prepared compounds of lime and $P_2O_5$ containing a lower ratio of CaO to $P_2O_5$ (that is, more $P_2O_5$) than calcium metaphosphate, $Ca(PO_3)_2$, can be acidified to produce phosphoric acid largely in the metaphosphoric form; and that under these conditions the usually troublesome impurities, such as iron and alumina, remain with the gangue in a form readily separable from the phosphoric acid by simple filtering, along with the calcium sulfate produced by acidification. Furthermore, the fluorine which usually accompanies crude phosphates is largely eliminated in this process, going forward with the off gases. The phosphoric acid obtained in accordance with this invention meets the requirements of a "food grade" phosphoric acid without any further purification.

In the practice of this invention, a preliminary step is the production of a calcium phosphate which is more acid than monocalcium metaphosphate in the sense that it contains a higher proportion of $P_2O_5$; that is to say, having a lower $CaO:P_2O_5$ ratio than the 1:1 ratio of monocalcium metaphosphate. It has been found that the acidification of calcium phosphates containing ratios of lime to $P_2O_5$ higher than 1:1 does not result in the desirable separation of iron and alumina obtained when operating in accordance with this invention; and best removal of these impurities is obtained when the initial step results in compounds or mixtures of the type represented by the formula $Ca_3P_8O_{23}$, in which the ratio of lime to $P_2O_5$ is 3:4.

Many methods and starting materials are available for producing combinations of lime and phosphoric acid having the desirable $CaO:P_2O_5$ ratio of 3:4; and numerous other compounds having even higher contents of $P_2O_5$ can also be produced in various ways. Among these compounds is $CaP_4O_{11}$, or $CaO.2P_2O_5$, in which the ratio of lime to $P_2O_5$ is 1:2. Such complexes or polyphosphates having compositions indicated by empirical formulas ranging from $Ca_3P_8O_{23}$ to $CaP_4O_{11}$ (that is, those containing lime and $P_2O_5$ in ratios between 3:4 and 1:2) are especially desirable for this invention. Compositions containing higher proportions of $P_2O_5$ generally form so much free metaphosphoric acid under the conditions of operation that a pasty condition develops on furnacing, making the manipulation more difficult. And as previously noted, compositions containing higher proportions of lime give less purification from metallic or acid-soluble impurities. When the lime ratio is higher than 1:1, substantially no purification is obtained.

As stated, various methods of producing complex acid calcium phosphates useful in accordance with this invention are available; any of various materials containing lime and $P_2O_5$ may be combined. In all cases, however, it is essential that a mixture containing available lime and phosphate values in the desired ratio be heated, usually to a temperature of the order of 300 to 400° C., and advantageously 350 to 380° C. A remarkable and highly advantageous feature of the invention is based on the discovery that dry solid mixtures can be obtained in this step, in spite of the high $P_2O_5$ content.

In one typical procedure, the starting materials are crude phosphate rock (which may be considered to be essentially a fluorine-containing tricalcium orthophosphate with more or less gangue), and crude phosphoric acid. The reaction involved may be indicated by the following equation:

1. $Ca_3(PO_4)_2 + 6H_3PO_4 + heat$
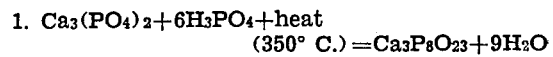
$(350° C.) = Ca_3P_8O_{23} + 9H_2O$ It should be understood that the existence of $Ca_3P_8O_{23}$ as a definite compound has not been fully established, and that this equation is merely intended to indicate the proportions of CaO and $P_2O_5$ in the product, which can also be designated $3CaO.4P_2O_5$.

The water formed by this reaction is driven off by the heating, and a dry granular material is obtained. A substantial proportion of the fluorine occurring in the crude rock is also eliminated by heating, and the complex calcium polyphosphate obtained by the stated reaction is quite low in fluorine. It is advantageous to grind the rock rather fine—so that 95 per cent will pass through a 100-mesh screen, for example—prior to the reaction. The reaction may be effected in any desired type of apparatus, an internally heated rotary kiln being generally most convenient.

The complex calcium phosphate material resulting from this procedure consists essentially of the stated $3CaO.4P_2O_5$ composition, sometimes called acid calcium metaphosphate, and gangue from the starting material, which usually carries compounds of iron and alumina. It is advantageously cooled, and is then charged into an acid-resistant mixing tank or chamber where it is treated with strong sulfuric acid—advantageously having a density of 66° Bé. (93 per cent $H_2SO_4$ by weight). The complex acid phosphate should be maintained in contact with the sulfuric acid at a temperature of the order of 150° C. for about one hour, in order to obtain the best results. During this time, free phosphoric acid is liberated, largely in the meta condition, and calcium sulfate is formed. This calcium sulfate carries substantially less water of hydration than gypsum, and generally less than the hemi-hydrate, but is nevertheless in a relatively stable form which filters and washes readily and does not rehydrate appreciably during washing. It is probably a mixture of anhydrite with one or more of the hydrated forms of calcium sulfate.

Iron and alumina in the gangue are apparently converted into metaphosphates by this treatment, and in any event are not greatly attacked by the sulfuric acid or the liberated phosphoric acid. The principal reaction may be expressed by the equation:

2. $2Ca_3P_8O_{23} + 6H_2SO_4 + 2H_2O + heat$
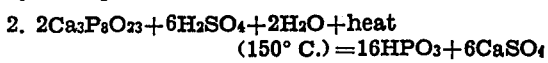
$(150° C.) = 16HPO_3 + 6CaSO_4$ The acidulated material is discharged as a dry or semi-fluid paste, advantageously while still hot, into a tank provided with a suitable acid-proof lining and an agitator. In this tank it is mixed with water—advantageously strong wash water from a previous batch—which is supplied in such proportions that a concentrated solution of phosphoric acid having a density of about 50 to 55° Bé. is formed. As noted, the acid as liberated is substantially all in the meta condition, but it soon reverts to pyrophosphoric acid and orthophosphoric acid by combination with the water present during this extraction stage.

An outstanding advantage of this procedure is that, as noted, the iron and alumina and other metallic impurities present in the starting material are largely converted to insoluble metaphosphates during the thermal treatments, and are thus readily separated from the phosphoric acid solution. Another advantage is that the calcium sulfate formed is largely in a stable crystalline form, which is readily filtered and washed. A simple filtering operation separates the pure phosphoric acid from the calcium sulfate and gangue constituents, and relatively small quantities of wash water are required in recovering retained acid from the filter cake.

Instead of starting with crude rock phosphate in the manner described, various other sources of $P_2O_5$ may be employed in accordance with this invention. For example, a beneficiated phosphatic intermediate containing $P_2O_5$ in the form of dicalcium pyrophosphate may be employed. Such an intermediate is readily produced by heating crude phosphate rock with crude phosphoric acid at a temperature of about 270° C., as described and claimed in a copending application Serial No. 365,126, filed November 9, 1940. This calcium pyrophosphate intermediate has a very low fluorine content, since more than 90 per cent of the original fluorine is eliminated during its production. The substitution of this intermediate for crude rock in the process of the present invention therefore makes it possible to obtain a final product of especially high purity. The reaction involved in forming the so-called acid calcium metaphosphate material of the present invention, when starting with the calcium pyrophosphate intermediate, may be illustrated by the following equation:

3. $3Ca_2P_2O_7 + 10H_3PO_4 + heat\ (350° C.) =$
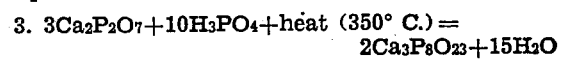
$2Ca_3P_8O_{23} + 15H_2O$ The acid calcium metaphosphate product having the approximate composition $3CaO.4P_2O_5$, when obtained in this manner has a very low fluorine content, due to the double furnacing treatment. It is treated with sulfuric acid as previously described, and phosphoric acid of exceptionally high purity is thus obtained.

In addition to the fact that this invention provides an improved method of producing phosphoric acid of high purity, it also provides a method of purifying crude phosphoric acid previously produced by any method. For example, the acid employed in accordance with Equations 1 and 3 may be crude acid obtained in accordance with the process of my above-identified application. When this crude acid is combined with lime, which is usually associated with further $P_2O_5$ values, to form the acid calcium metaphosphate containing lime and $P_2O_5$ in ratios between 1:1 and 1:2 in accordance with this invention, and then acidified with strong $H_2SO_4$, a phosphoric acid of high purity and desirable concentration is produced without resorting to expensive purifying procedures or evaporative concentration.

In a useful embodiment of this invention, crude phosphate rock was ground to such fineness that about 95 per cent would pass through a 100-mesh screen, and was mixed with crude orthophosphoric acid in such proportions that the mixture contained available lime and $P_2O_5$ in a molar ratio of 2:1. This mixture was charged to a rotary internally fired kiln where it was heated to a temperature of about 270° C. for about 25 minutes, thus producing an intermediate containing substantially all its phosphatic values in the form of dicalcium pyrophosphate, $Ca_2P_2O_7$, in accordance with the acknowledged application Serial No. 365,126, filed November 9, 1940. A substantial part of this calcium pyrophosphate intermediate was then mixed with 60° sulfuric acid (78 per cent $H_2SO_4$) and strong wash water from a prior batch, to form crude phosphoric acid, initially in the pyro form, which reverted to orthophosphoric acid in the presence of the water. About one-third to one-half of the crude acid thus obtained was back-cycled to treat further quantities of phosphate ore to obtain a further quantity of the calcium pyrophosphate intermediate.

The remaining portion of the calcium pyrophosphate intermediate of low fluorine content from the first operation was mixed with a sufficient quantity of the crude orthophosphoric acid from the second operation, to give the mixture a contained ratio of available lime and $P_2O_5$ of slightly less than 3:5. This mixture was heated to a temperature of 380° C., with a total heating time of 3 hours, thus forming a dry granular product containing substantially all of the phosphate in the form of a complex calcium polyphosphate containing more $P_2O_5$ than mono-calcium metaphosphate. This material was cooled to about 150° C. and mixed with about 3 molar equivalents of concentrated sulfuric acid, then agitated with strong wash water from a previous batch of pure acid. The slurry thus obtained was filtered on a vacuum filter, and a good yield of phosphoric acid solution having a density of 55° Bé. was obtained.

This acid contained only 0.2 per cent of combined iron and alumina (based on the $P_2O_5$ content) and, less than 18 parts fluorine per million parts of $P_2O_5$. The purity of the acid thus obtained will readily be understood to be exceptional for processes of this type involving no separate purification. Also the concentration is notable in processes employing no evaporative treatment. These features contribute to the economy of the process; and the ease with which the calcium sulfate and gangue are filtered out, due to the relatively dense and stable condition of the $CaSO_4$, also contribute to this result. As stated, the calcium sulfate formed contains less water of crystallization than gypsum (that is, less than $2H_2O$ per molecule of calcium sulfate), and often less than the 0.5 molecule of $H_2O$ found in hemihydrate. Also, this sulfate is considerably denser than gypsum; it neither locks up so much water as water of crystallization nor does it occupy so much space. Relatively little wash water is required in this process because of the condition in which the calcium sulfate precipitates; and the wash water which is produced is readily utilized in the process as described hereinabove. It is, of course, desirable to utilize the wash water from the crude acid filtration in the production of further quantities of the crude acid, while the wash water from the final pure acid filtration is advantageously kept separate and utilized in the production of further quantities of pure acid.

It is well known that most phosphatic raw materials contain considerable amounts of associated gangue, which usually includes calcium carbonate and other calcium minerals acted on by sulfuric acid. Also, the usual fluorine content of raw phosphates is probably due to calcium fluoride in apatite-like combination with tri-calcium orthophosphate. The lime in such compounds must generally be considered as available CaO in computing overall ratios of $CaO:P_2O_5$ for the purposes of this invention.

The term "available CaO" whenever used herein refers to calcium (computed as CaO) in a form reactive with the digesting acids in contradistinction to calcium that may be present in a form non-reactive with the digesting acids which must be considered as unavailable CaO, therefore to be excluded in computing the ratio $CaO:P_2O_5$. For example, calcium silicate may be present in the phosphatic raw materials in a form not reactive with the digesting acid. Such calcium silicate will go forward and be discarded in what is called "gangue." Other acid insoluble compounds containing calcium in a form unavailable, such as calcium sulphate may also be present. If the calcium in these acid insoluble compounds is taken into consideration in calculating the $CaO:P_2O_5$ ratio it is obvious that an excessive amount of phosphoric acid would be used. Calcium present in "available" form will react with the sulfuric acid used and be removed as precipitated calcium sulphate.

It is to be understood that the terms "CaO," "$P_2O_5$" and "alumina," as used in the present specification and claims, do not necessarily refer to individual and discrete compounds. On the contrary, in the process disclosed these entities probably exist as components of complex salts or the like. While the exact nature of all the chemical compounds in rock phosphate is not specifically known, these expressions may be used in specifying the practice of the present invention. Similarly the term "phosphoric acid" is broadly employed and contemplates acids containing $P_2O_5$ in a form available for reaction with metals or other compounds.

While the invention has been described hereinabove with special reference to certain manipulative procedures, reagents, concentrations, temperatures, etc., which are now considered advantageous, it should be understood that it may be modified and otherwise practiced within the scope of the appended claims.

By the term "rock phosphate" as used in the present specification and claims is meant raw phosphatic materials used in the manufacture of phosphoric acid such as apatite, phosphate rock, pebble phosphate and the like.

What we claim is:

1. In the manufacture of phosphoric acid from phosphatic material containing CaO, $P_2O_5$, gangue and fluorine and including aluminum and iron impurities, the process which comprises mixing the said phosphatic material with a phosphoric acid in such an amount that the molar ratio of the content of calcium calculated as CaO present in a chemical form reactive with phosphoric acid and sulfuric acid, to the $P_2O_5$ content in the mixture is less than 1:1 but not substantially less than 1:2, heating the mixture at a temperature from about 300° to 400° C. so that the iron and alumina in the mixture are substantially converted to insoluble iron and aluminum meta-phosphates and the fluorine is substantially completely driven off, mixing the resultant material with strong sulfuric acid so that free phosphoric acid and dense readily filtering magma containing gangue and stable calcium sulfate carrying less water than gypsum and containing insoluble iron and aluminum meta-phosphates is formed, and filtering the material to recover relatively pure, strong phosphoric acid.

2. In the manufacture of phosphoric acid from phosphatic material comprising compounds containing CaO and $P_2O_5$, together with impurities comprising other acid soluble metal compounds and gangue, the process which comprises mixing the said phosphatic material with a phosphoric acid in such an amount that the molar ratio of the content of calcium calculated as CaO present in a chemical form reactive with phosphoric and sulfuric acids, to the $P_2O_5$ content in the mixture is less than 1:1 but not substantially less than 1:2, heating the mixture at a temperature from about 300° to 400° C. so that the said other acid soluble metal compounds in the mixture as impurities are substantially converted to insoluble metaphosphates, treating the resultant material with strong sulfuric acid to form free phosphoric acid and a dense readily separable magma containing gangue, and stable calcium sulfate carrying less water than gypsum, and containing the said insoluble meta-phosphates, and separating the phosphoric acid from the magma as a relatively pure product of strong concentration.

3. In the manufacture of phosphoric acid from phosphatic material comprising compounds containing CaO, $P_2O_5$ and fluorine together with impurities comprising other acid soluble metal compounds and gangue, the process which comprises mixing the said phosphatic material with a phosphoric acid in such an amount that the molar ratio of the content of calcium calculated as CaO present in a chemical form reactive with phosphoric acid and sulfuric acid, to the $P_2O_5$ content in the mixture is less than 1:1 but not substantially less than 1:2, heating the mixture at a temperature from about 300° to 400° C. so that the said other acid soluble metal compounds in the mixture as impurities are substantially converted to insoluble meta-phosphates and the fluorine is substantially completely driven off, treating the resultant material with strong sulfuric acid to form free phosphoric acid and a dense readily separable magma containing gangue, and stable calcium sulfate carrying less water than gypsum, and containing the said insoluble metaphosphates, and separating the phosphoric acid from the magma as a relatively pure product of strong concentration.

4. In the manufacture of phosphoric acid from phosphatic material comprising gangue and compounds containing CaO, $P_2O_5$, and fluorine and including acid soluble compounds of iron and aluminum as impurities, the process which comprises mixing the said phosphatic material with a phosphoric acid in such an amount that the molar ratio of the content of calcium calculated as CaO present in a chemical form reactive with phosphoric acid and sulfuric acid, to the $P_2O_5$ content in the mixture is less than 1:1 but not substantially less than 1:2, heating the mixture at a temperature from about 300° to 400° C. so that the iron and aluminum in the mixture are substantially converted to insoluble iron and aluminum meta-phosphates and the fluorine is substantially completely driven off, mixing the resulting material with strong sulfuric acid so that free phosphoric acid and dense readily filtering magma containing gangue and stable calcium sulfate carrying less water than gypsum and containing iron and aluminum meta-phosphates is formed, adding sufficient water to dissolve the liberated phosphoric acid and form a solution thereof having the desired concentration, and filtering the material to recover relatively strong phosphoric acid.

5. In the manufacture of phosphoric acid from phosphatic material containing dicalcium pyrophosphate and gangue and including aluminum and iron impurities, the process which comprises mixing the said phosphatic material with a phosphoric acid in such an amount that the molar ratio of the content of calcium calculated as CaO present in a chemical form reactive with phosphoric and sulfuric acid, to the $P_2O_5$ content in the mixture is less than 1:1 but not substantially less than 1:2, heating the mixture at a temperature from about 300° to 400° C. so that the iron and aluminum in the mixture are substantially converted to insoluble iron and aluminum meta-phosphates and the fluorine is substantially completely driven off, mixing the resulting material with strong sulfuric acid so that free phosphoric acid and dense readily filtering magma containing gangue and stable calcium sulfate carrying less water than gypsum and containing iron and aluminum meta-phosphates is formed and filtering the material to recover relatively strong phosphoric acid.

6. In the manufacture of phosphoric acid from phosphatic material comprising gangue and compounds containing CaO, $P_2O_5$ and fluorine together with acid soluble compounds of aluminum and iron as impurities, the step which comprises treating a mixture of said phosphatic material and added ortho-phosphoric acid wherein the molar ratio of the content of calcium calculated as CaO present in a chemical form reactive with phosphoric acid and sulfuric acid, to the $P_2O_5$ content in the mixture is less than 1:1 but not substantially less than 1:2 and which has been heated to a temperature of 300° to 400° C. until the iron and aluminum compounds are converted into insoluble meta phosphates and the fluorine is substantially completely driven off, with strong sulfuric acid to form a free phosphoric acid and a dense readily separable magma containing gangue and stable calcium sulfate carrying less water than gypsum and containing insoluble iron and aluminum meta-phosphates, and separating the phosphoric acid from the magma.

7. A process as defined in claim 2 wherein the mixture is heated at a temperature within the range of 350° to 380° C.

8. A method as defined in claim 2 wherein the mixture of phosphatic material with phosphoric acid is in such relative amount that the molar ratio of CaO:P₂O₅ is within the range of from about 3:4 to about 1:2.

9. In the manufacture of phosphoric acid from phosphatic material comprising gangue and compounds containing CaO, P$_2$O$_5$ and fluorine together with acid soluble compounds of aluminum and iron as impurities, the step which comprises treating a mixture of said phosphatic material and added ortho-phosphoric acid wherein the molar ratio of the content of calcium calculated as CaO present in a chemical form reactive with phosphoric acid and sulfuric acid, to the P$_2$O$_5$ content in the mixture is less than 1:1 but not substantially less than 1:2 and which has been heated to a temperature of 300° to 400° C. until the iron and aluminum compounds are converted into insoluble meta-phosphates and the fluorine is substantially completely driven off, with strong sulfuric acid to form a free phosphoric acid and a dense readily separable magma containing gangue and stable calcium sulfate carrying less water than gypsum and containing insoluble iron and aluminum meta-phosphates, adding sufficient water to dissolve the liberated phosphoric acid and form a solution thereof having the desired concentration and separating the solution from the magma.

JOHN HARRY COLEMAN.
STEPHEN G. POLL.

CERTIFICATE OF CORRECTION.

Patent No. 2,338,408. January 4, 1944.

JOHN HARRY COLEMAN, ET AL.

It is hereby certified that error appears in the printed specification of the above numbered patent requiring correction as follows: Page 3, first column, line 46, for "less than 3:5" read --less than 3:4--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.